US007787903B1

(12) United States Patent
Myers

(10) Patent No.: US 7,787,903 B1
(45) Date of Patent: Aug. 31, 2010

(54) PORTABLE RADIO VEHICULAR INSTALLATION APPARATUS WITH BACK-UP BATTERY POWER AND METHOD

(75) Inventor: Stephen R. Myers, Allen, TX (US)

(73) Assignee: RadioShack, Corporation, Fort Worth, TX (US)

( * ) Notice: Subject to any disclaimer, the term of this patent is extended or adjusted under 35 U.S.C. 154(b) by 1254 days.

(21) Appl. No.: 11/247,728

(22) Filed: Oct. 11, 2005

(51) Int. Cl.
*H04M 1/00* (2006.01)

(52) U.S. Cl. ............... 455/556.1; 455/556.2; 455/557; 455/575.1

(58) Field of Classification Search .............. 455/550.1, 455/556.1, 556.2, 557, 575.1
See application file for complete search history.

(56) References Cited

U.S. PATENT DOCUMENTS 5,794,138 A * 8/1998 Briskman .................. 455/344
6,023,616 A 2/2000 Briskman
6,295,033 B1 9/2001 Chatzipetros
6,421,020 B1 7/2002 Chatzipetros
6,909,907 B1 * 6/2005 Oyang et al. ............. 455/556.1
2001/0041541 A1 * 11/2001 Nokkonen et al. ............ 455/83
2002/0198031 A1 * 12/2002 James Holmes et al. .... 455/569

* cited by examiner

*Primary Examiner*—Tuan H Nguyen
(74) *Attorney, Agent, or Firm*—Dan Brown Law Office; Daniel R. Brown

(57) ABSTRACT

A portable radio vehicular interface apparatus and method. The apparatus includes a plural interface connector conformed to the shape and electrical interfaces of the portable radio. The apparatus includes a battery housing that is coupled to provide power to the portable radio through a single sheath cable connected to the plural interface connector. The cable also encases an antenna conductor that couples the plural interface connector to an antenna terminal on the battery housing. The apparatus also includes a vehicle interface coupled to charge the battery from a vehicle power system.

14 Claims, 7 Drawing Sheets

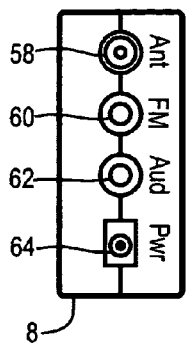
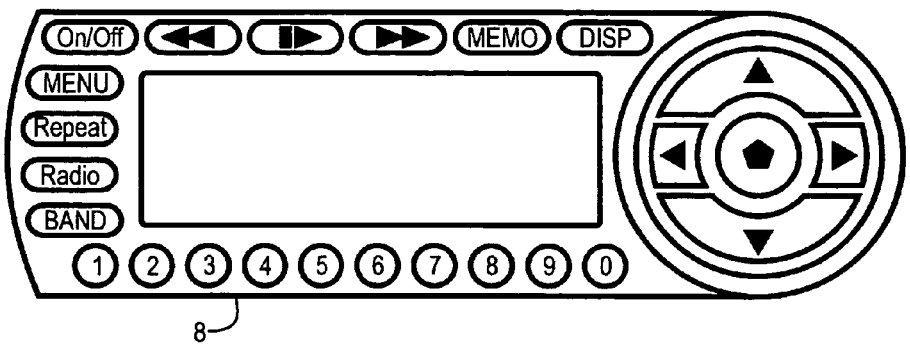
Fig. 4 Prior Art
Fig. 3 Prior Art
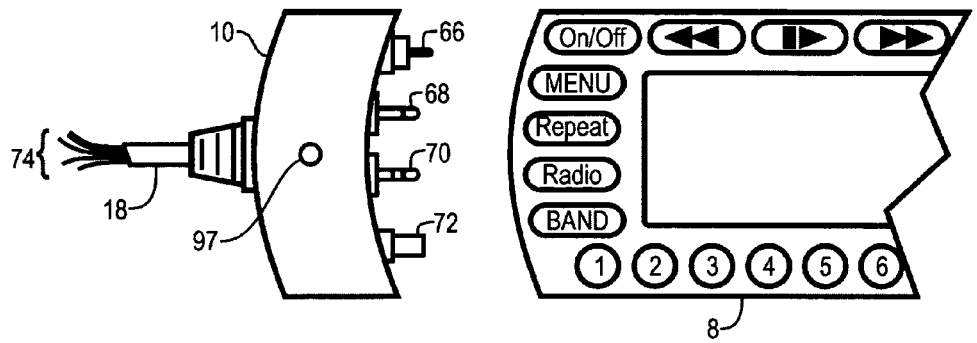
Fig. 5
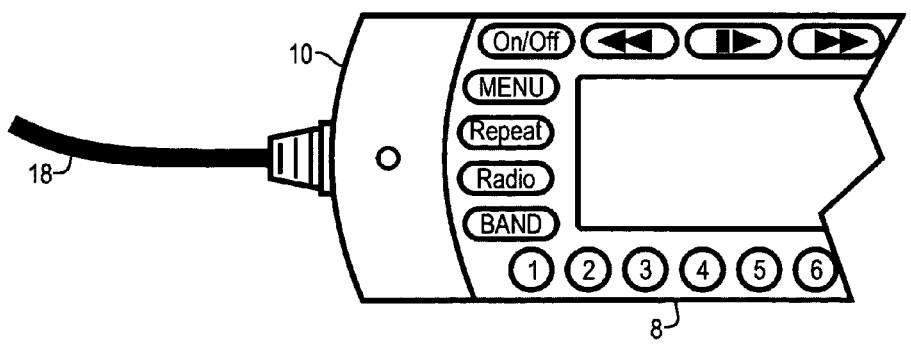
Fig. 6

PORTABLE RADIO VEHICULAR INSTALLATION APPARATUS WITH BACK-UP BATTERY POWER AND METHOD

BACKGROUND OF THE INVENTION

1. Field of the Invention

The present invention relates to vehicular radio installations. More particularly, the present invention relates to a system and method of electrically coupling a portable radio receiver into a vehicle, including power, antenna, and audio interface connections.

2. Description of the Related Art

The modern consumer of audio programming and audio content, such as music, sports, news, and other information, has a wide variety of terminal unit types available to them. In addition, there is a wide range of media and mediums through which such audio content can be transferred and stored. Sources of audio content include media such as cassette tapes, compact discs and memory devices, all of which are provided with audio content prerecorded for reproduction through a suitable playback device. Audio content is also available through radio broadcast mediums, such as the ubiquitous AM and FM broadcast bands in the United States and around the world. More recently, direct broadcast satellite ("DBS") service for audio content has become available to users. Direct broadcast satellite services are commercially available from XM Satellite Radio and Sirius Satellite Radio for a recurring service fee. Users are also able to access audio content through the Internet in the form of audio data files, which can be communicated through physical networks or through wireless networks, such as wireless and cellular telephone networks and WiFi networks. Various terminal units and devices are known, with an ever increasing variety being made available each year.

On the consumer side of the audio content distribution and consumption process, terminal units are employed to convert the media or medium's electronic and digital files into perceptible acoustic sounds waves. Such terminal units are broadly categorizes as home (or office), vehicular, and portable devices, which correspond to the places and activities where users operate the terminals and consume audio content. It should be noted that the distinction between vehicular and portable terminals is blurred by a particular type of terminal unit called a transportable. Transportable terminals can be fixed in a vehicle and then removed for portable operation. With respect to DBS services, there is particular challenge in that relatively weak signal from a distance geosynchronous satellite must be intercepted with by an antenna having enough signal gain to output a recoverable signal. An antenna having gain is, by definition, directive and must be aimed at the broadcast source in order to function reliably. For portable operation, antenna aiming is a significant product challenge.

A terminal product type that has become popular with consumers is the direct broadcast satellite radio transportable unit, such as the Starmate Replay ST2 model offered by Sirius Satellite Radio, for example. The transportable terminal is characterized be its ability to be selectively interfaced with a vehicular mounted antenna, power system, and vehicular audio systems while it is used in its vehicular mode of operation. The transportable terminal unit is further characterized by its ability to be disconnected from the vehicular interfaces for use in the portable mode of operation. As noted above, DBS signal strength and antenna gain requirements are challenging to the portable operation of DBS receivers. This issue has been addressed by adding a record and playback function to the terminal unit. With this function, the streaming audio content is buffered or stored and can be reviewed and played at a later time according to the user's desires. This is particularly useful during portable operation, where a reliable satellite signal is not available. A useful mode of operation is to receive and record audio content while the transportable terminal is interfaced in its vehicular mode of operation, and then replay the audio content during the portable mode of operation. This process entails connecting and disconnecting from the vehicular interface, and the need for reliable power from the vehicle power system.

Transportable DBS radios, such as the Starmate Replay, typically include an external antenna terminal, an external power terminal, an audio output connector and an FM transmitter output. The audio output connector can be used to coupled the received or replayed audio content to the vehicle stereo system or another audio device, such as an MP3 player, mini-disc recorder, etc. DBS receivers are known to include a low power FM transmitter that modulates and transmits the audio content within the FM commercial broadcast band. This feature enables the user to transmit from the DBS radio to the vehicle FM stereo, so the received audio content can be reproduced over the vehicle stereo system loudspeakers. Since there is sometimes interference received from regular commercial FM transmissions, the DBS received provides a metallic interface of the low power modulated FM signal, which can be coupled to the antenna input of the vehicle FM stereo system. Thus, the DBS radio, while operating in the vehicular mode has a number of wires and cables attached to it. In operation, this is a messy solution prone to entanglement and reliability issues. In addition, the installation process for a multiple cable system is more complex and is frequently beyond the ability of a casual user. Thus, it can be appreciated that there is a need in the art for an apparatus and method of installing a portable radio in a vehicular environment.

SUMMARY OF THE INVENTION

The need in the art is addressed by the apparatus and methods of the present invention. The present invention teaches a portable radio vehicular interface apparatus. The apparatus includes a plural interface connector conformed to the shape and electrical interfaces of the portable radio. The apparatus includes a battery housing that is coupled to provide power to the portable radio through a single sheath cable connected to the plural interface connector. The cable also encases an antenna conductor that couples the plural interface connector to an antenna terminal on the battery housing. The apparatus also includes a vehicle interface coupled to charge the battery from a vehicle power system.

The present invention teaches a method of coupling a portable radio into a vehicle using a vehicular interface system. The interface system includes a plural interface connector conformed to the shape and electrical interfaces of the portable radio and a battery housing coupled to provide power to the portable radio through a single sheath cable connected to the plural interface connector. The cable encases an antenna conductor coupling the plural interface connector to an antenna terminal on the battery housing. The interface system also includes a vehicle interface coupled to charge the battery from a vehicle power system. The method includes the steps, accomplished by a skilled installer, of installing the battery housing in a discrete location within the vehicle, connecting an external antenna to the antenna terminal, and connecting the vehicle interface to the vehicle power system. The final step, which can be accomplished by anyone, consists of connecting the plural interface connector to the portable radio, thereby enabling operation thereof within the vehicle.

The present invention also teaches an apparatus for installing a portable radio in vehicle with a power system, where the portable radio has an external antenna terminal for coupling radio signals with an external antenna cable, and also has an external power terminal. The apparatus includes a conformal connector that has a first antenna connector and a first power connector configured to conform to and electrically engage the external antenna terminal and external power terminal. It also includes an interface enclosure that has a second antenna connector for engaging the external antenna cable, and has a battery and charging circuit with a power input terminal and a power output terminal. The charger charges the battery and delivers power to the power output terminal from either of the power input terminal or the battery. The apparatus also includes a radio interface cable covered by a single sheath with a first end coupled to the conformal connector and a second end coupled to the interface enclosure and also encases an antenna conductor connected between the first antenna connector and the second antenna connector. The radio interface cable also has a first power conductor coupled between the first power connector and the power output terminal. The apparatus also includes a vehicle interface that has a second power conductor coupled to the power input terminal and that is adapted to connect to the vehicle power system.

In a specific embodiment of the foregoing apparatus, the vehicle interface is a cable coupled to the interface enclosure. In another specific embodiment, the vehicle interface includes a cigarette lighter adapter for engaging a cigarette lighter socket in the vehicle. In another specific embodiment of the apparatus, the portable radio has an audio output terminal, and the conformal connector further includes a first audio connector for engaging the audio output terminal. In addition, the interface enclosure further includes a second audio connector, and, the radio interface cable further includes an audio conductor coupled between the first audio connector and the second audio connector.

In a specific embodiment of the foregoing apparatus, the portable radio has an FM modulator output terminal, and the conformal connector further includes an FM modulator connector for engaging the FM modulator terminal. The interface enclosure further includes an FM antenna input connector coupled to an FM output connector, and also includes an FM signal coupler disposed to couple FM signals to the FM antenna output connector. The radio interface cable further includes an FM signal conductor coupled between the FM modulator connector and the FM signal coupler. In another specific embodiment of the foregoing apparatus, the interface enclosure further includes a circuit protector electrically coupled to the power input terminal. In another specific embodiment, the interface enclosure is formed with a flat profile, thereby enabling installation in narrow locations within the vehicle interior. In yet another specific embodiment, the conformal connector is designed to compliment the industrial design of the portable radio.

In a specific embodiment of the foregoing apparatus, the interface enclosure includes a visual power indicator coupled to the power input terminal, thereby indicating the availability of power from the vehicular power system. In another embodiment, the conformal connector includes a visual power indicator coupled to the first power conductor, thereby indicating the availability of power from the vehicular power system. In a particular embodiment of the apparatus, the vehicle interface includes a cigarette lighter adapter plug for engaging a cigarette lighter socket in the vehicle. The interface enclosure and the cigarette lighter adapter plug may be coupled together with a vehicle interface cable encasing the second power conductor. The interface enclosure and the vehicle interface cable may be coupled through a detachable electrical connector. Similarly, the radio interface cable and the interface enclosure are coupled through a detachable electrical connector.

BRIEF DESCRIPTION OF THE DRAWINGS

FIG. 3 is a front view drawing of a prior art transportable DBS satellite radio receiver.

FIG. 4 is an interface end view drawing of a prior art transportable DBS satellite radio receiver.

FIG. 5 is a drawing of a conformal connector and DBS radio according to an illustrative embodiment of the present invention.

FIG. 6 is a drawing of a conformal connector and DBS radio according to an illustrative embodiment of the present invention.

FIGS. 7, 7a, 7b, and 7c are functional block diagrams of a portable radio interface apparatus according to illustrative embodiments of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

The present invention advances the art by enabling a two-stage installation process of an apparatus for installing a portable radio in a vehicle. A relatively skilled installer accomplishes the first stage of the installation. The installer mounts an interface enclosure at a discreet location within a vehicle, and connects an external antenna and vehicular power to the interface enclosures. A single, multiple conductor cable is coupled to the enclosure at one end, and at the other end is attached to a conformal connector. The conformal connector has plural connectors, including power and antenna connectors, which electrically and physically engage the portable radio. The conformal connector is designed to compliment the industrial design of the portable radio. This arrangement renders an attractive system whose installation can easily be completed by the end user. The second step merely includes plugging the conformal connector into the portable radio.

The installed apparatus is particularly clean and simple by virtue of the single cable between the portable radio and the interface enclosure, which is placed in a discreet location. In the illustrative embodiment, the portable radio is a direct broadcast satellite transportable radio, such as the currently available Sirius Satellite Radio Starmate Replay ST2 radio. The single radio interface cable carries the external antenna cable, the power cable, and audio output cable, and even a metallic FM modulator output cable. In the prior art, such an installation would entail four separate wires running to and from the satellite receiver. The prior art approach is complex, messy and highly unattractive. Through utilization of the teachings of the present invention, the process of installing and removing the satellite radio from the vehicle is quick, clean, simple and very attractive.

Figure 1:
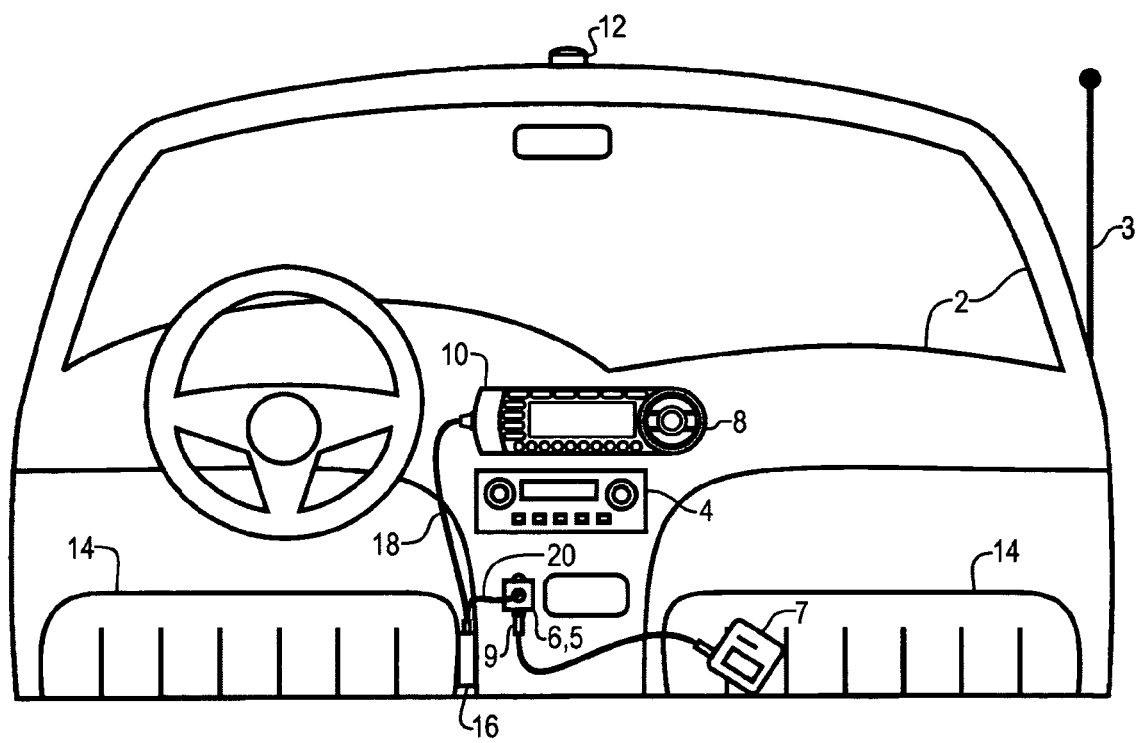
FIG. 1 is a vehicular installation drawing according to an illustrative embodiment of the present invention.

Reference is directed to FIG. 1, which is a vehicular installation drawing according to an illustrative embodiment of the present invention. A transportable satellite radio receiver 8 is mechanically fixed to a vehicle dashboard 2 in a manner known to those skilled in the art. Within the vehicle 2 is also located a pair of front seats 14, an in-dash FM car radio 4 and cigarette lighter socket 5 (not visible, see below), and conventional automotive AM and FM antenna 3. An interface enclosure 16 according to an illustrative embodiment of the present invention is discretely located between the seat 14 and the dash 2, which is possible due to the narrow proportion of the interface enclosure 16. The interface enclosure 16 has been installed by a relatively skilled installer, and is discretely connected to a satellite radio antenna 12 with a hidden antenna cable. A vehicle interface cable 20 is routed between the interface enclosure 16 and a vehicle interface 6, which is configured as a cigarette lighter adapter ("CLA") plug in this illustrative embodiment.

The vehicle interface cable 20 includes power conductors, which take power from the vehicle electrical system through the cigarette lighter socket, and audio signal conductors, which receive radio audio signals through the interface enclosure 16. The vehicle interface 6 includes an audio output jack, into which an audio cable 9 is plugged. In the illustration of FIG. 1, the minidisk recorder 7 is coupled to receive audio signals, to illustrate the advantage of the audio output 9 being located at a convenient location on the vehicle interface 6. In other illustrative embodiments, the vehicle interface cable 20 is discretely routed to the vehicle electrical system fuse block (not shown), so as to be completely discreet from the user's point of view. The interface enclosure 16 is coupled to the satellite radio 8 through a multiple conductor radio interface cable 18 and a conformal connector 10. The conformal connector is formed and adapted to engage the satellite radio 8 antenna terminal, power terminal, and audio output terminal (not shown) and to be styled to compliment the design of the satellite radio 8. Thus the illustrative embodiment provides a means to install and remove the satellite radio 8 from the vehicle using a single connector 10 and single cable 18. The installation is clean, unobtrusive, and is easy for the unskilled user to access and operate.

Figure 2:
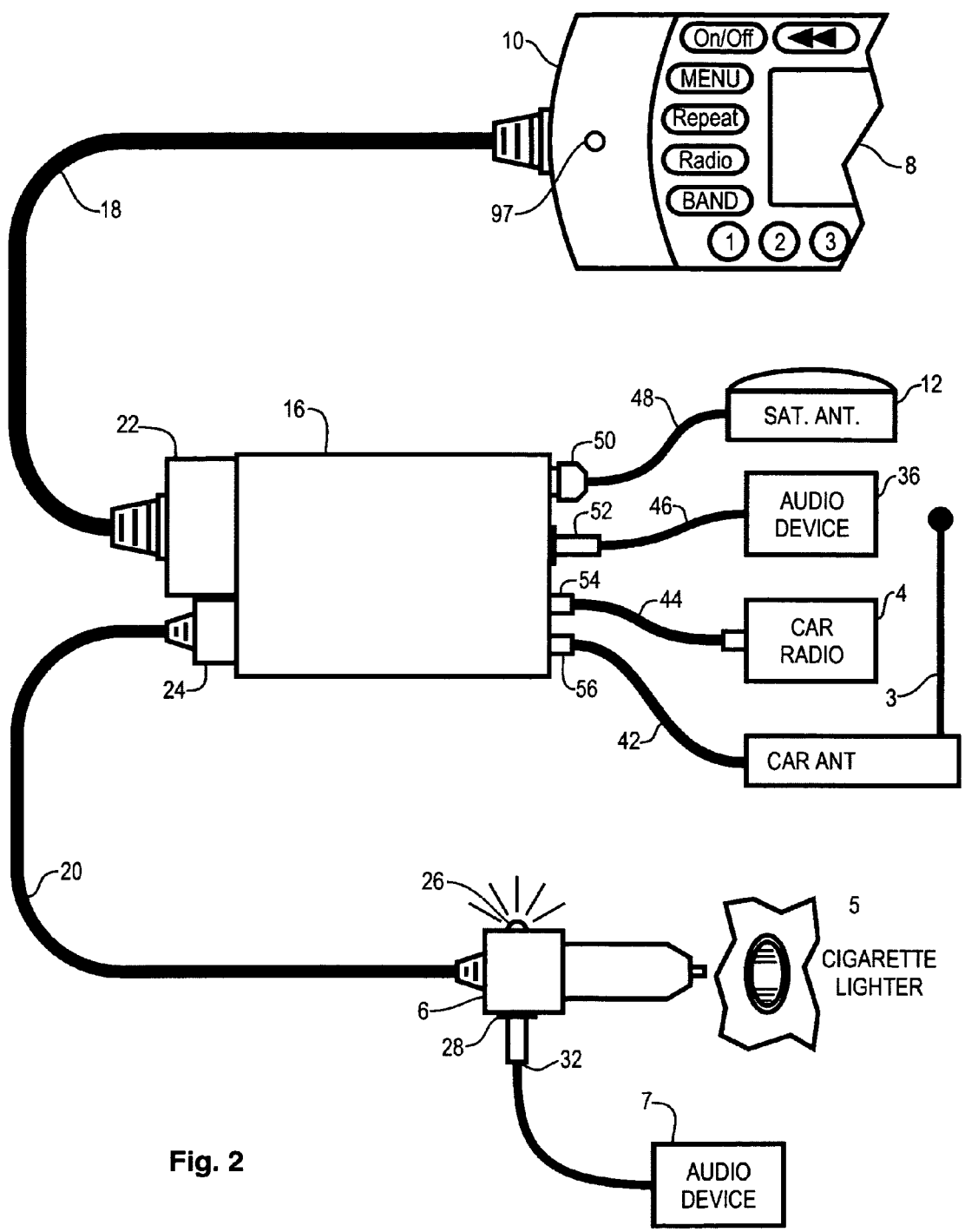
FIG. 2 is a component and wiring diagram of an illustrative embodiment of the present invention.

Reference is directed to FIG. 2, which is a component and wiring diagram of an illustrative embodiment of the present invention. The satellite radio 8 is shown, in part, and is connected to the interface enclosure 16 through the radio interface cable 18 and conformal connector 10. Note that the conformal connector 10 has a light emitting diode 97 disposed in its outer surface, which serves to indicate the presence of electric power being available from the interface enclosure. The interface enclosure end of the radio interface cable is coupled through a detachable connector 22, which employs a proprietary connector layout. The benefit of a detachable connector 22 is that a given interface enclosure can be used with a variety of radios by connecting an appropriate cable and conformal connector. In other embodiments, the radio interface cable 18 is hard-wired to the interface enclosure, which results in a lower production cost. As noted hereinbefore, the radio interface cable is a multiple conductor cable employing a single sheath to encase the power, antenna, audio, and other electrical conductors, which may vary from radio type to radio type.

The interface enclosure 16 is coupled to the vehicle electrical system through a vehicle interface cable 20, which is connected to the interface enclosure 16 with a detachable connector 24. Connector 24 is also designed according to a proprietary standard. In other embodiments, the vehicle interface cable 20 may be hard wired to the interface enclosure 16. In the illustrative embodiment, the vehicle interface is accomplished using a cigarette lighter adapter ("CLA") plug unit 6, which engages the vehicle cigarette lighter socket 5 to acquire power from the vehicle electrical system. The CLA unit 6 also presents an audio output jack 28, which is used to provide the audio content from the radio 8, through the interface enclosure 16, for user connection of a generic audio device 7 through a conventional audio cable 32, as are know to those skilled in the art. The CLA unit 6 also includes a light emitting diode 26, which indicates that reliable power connection to the vehicle electric system through the CLA socket 5 has be achieved.

In the illustrative embodiment, the interface enclosure 16 serves as the access point for interconnecting various other signals and conductors that are required or desired in the radio interface to the vehicle. In particular, the satellite antenna 12 is coupled by a discretely routed antenna cable 48 and antenna connector 50 to the interface enclosure 16. The interface enclosure 16 also provides an audio output for connecting another audio device 4 through an audio cable 46 and plug 52, as are known to those skilled in the art. In the illustrative embodiment, the satellite radio 8 includes an FM modulator, which is used for short-range radio transmission of the audio content to the vehicle's FM radio for demodulation and reproduction over the system speakers. Since there can be radio interference is such a wireless system, certain satellite receivers provide a metallic RF radio connection terminal (not shown) which is engaged by the conformal connector 10. This signal is conducted through the radio interface cable 18 into the interface enclosure 16. To take advantage of this FM modulator feature, the interface enclosure 16 provides two FM antenna jacks 54, 56. The vehicle antenna wire 42 is coupled to connector 56, and a second antenna cable 44 is connected between the interface enclosure 16 at jack 54 and the vehicles FM radio 4. Within the interface enclosure 16, the metallic FM modulator signal from the satellite radio 8 is coupled to the vehicle radio 4 antenna cable 44, thereby overcoming any radio interference issues while allowing normal reception of broadcast stations.

Reference is directed to FIG. 3, which is a front view drawing of a prior art transportable DBS satellite radio receiver 8. The drawing in FIG. 8 approximates the appearance of the aforementioned Starmate Replay ST2 radio, however it is to be understood that this represents one illustrative application of the present invention, and that virtually any portable device the requires power and a radio signal from an external antenna is applicable to the teachings of the present invention. FIG. 4 illustrates the interface end view of the satellite radio 8. In the illustrative embodiment, the radio 8 includes and external antenna terminal 58, a FM modulator output terminal 60, a stereo audio output terminal 62, and a power input terminal 64, all of which are disposed on an arcuate end surface of the radio 8. It will be appreciated by those skilled in the art that various enclosure configurations are employed in modern radio devices, frequently given to issues of style and convenience.

Reference is direct to FIG. 5, which is a drawing of a conformal connector 10 and DBS radio 8 according to an illustrative embodiment of the present invention. The conformal connector 10 is formed of a style to compliment the appearance and shape of the radio 8, including the arcuate end on which the aforementioned interface terminals are disposed. The conformal connector includes plural jacks that correspond to the plural terminals on the radio. Specifically, these include an RCA phono antenna jack 66 for the satellite antenna input, a ⅛" mini-jack 68 for the FM modulator output, a ⅛" stereo mini-jack 70 for the audio output, and a DC power jack 72 for the external power terminal. The conformal connector also includes a light emitting diode 97, which illuminates when power is present in the power jack 72. The radio interface cable 18 is coupled to the conformal connector 10 through a strain relief and includes the plural conductors 74 to accommodate the various signals. FIG. 6 illustrates the appearance of the conformal connector 10 and radio 8 when they are coupled together, and shows the clean appearance of the single cable interface.

Figure 7:
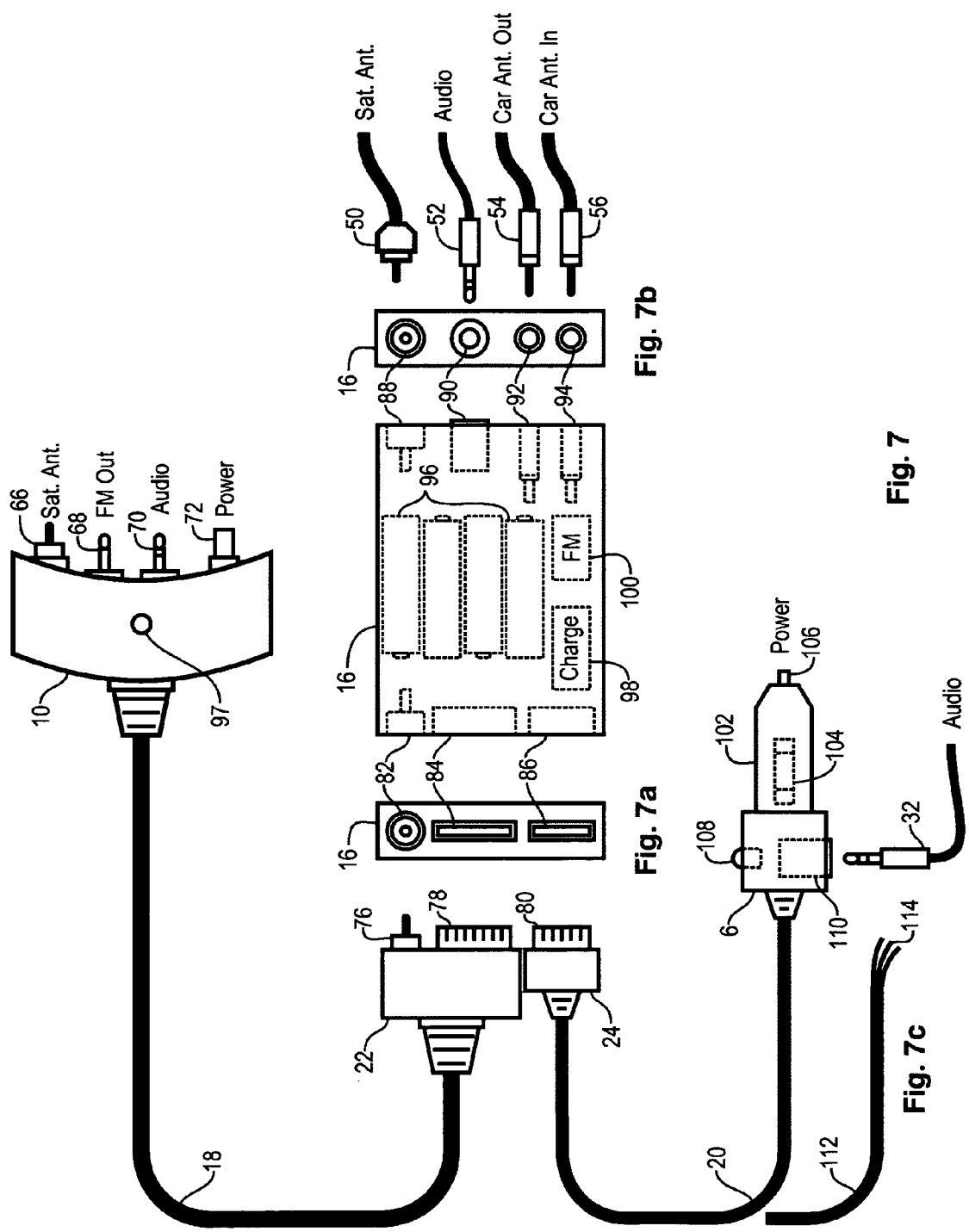

Reference is directed to FIGS. 7, 7a, 7b, and 7c, which are functional block diagrams of a portable radio interface system according to an illustrative embodiment of the present invention. FIG. 7 illustrates the overall arrangement of the apparatus of the illustrative embodiment. FIGS. 7a and 7b illustrate end view breakouts showing the narrow profile of the interface enclosure 16. FIG. 7c illustrates an alternative embodiment for the vehicle interface cable 112, which is adapted for hard-wired connection to the vehicle.

Again referring to FIG. 7, the apparatus of the present invention includes an interface enclosure 16 that acts as an interconnecting node and battery power supply for the satellite radio (not shown). A radio interface cable 18 and conformal connector 10 couple the radio to the interface enclosure 16. As noted above, the conformal connector 10 of the illustrative embodiment includes a power indicating LED 97, a satellite antenna plug 66, an FM modulator plug 68, an audio plug 70, and a power supply plug 72 that conform to the shape and electrical requirements of the host radio (not shown). At the other end of the radio interface cable is a detachable connector 22 that includes a satellite antenna plug 76 and a multiple conductor bus connector 78, which includes the required conductors to meet the remaining radio interface needs. On the end of the interface enclosure 16 are corresponding jacks for the antenna 82 and bus connector 84. A similar connector 86 is provided for the vehicle interface cable 20, which carries power and audio signals in the illustrative embodiment. The vehicle interface unit 6 is coupled to the vehicle interface cable 20. The vehicle interface unit is configured as a CLA plug 102 with a power pin 106 and fuse 104 therein. An audio jack 110 is provided for convenient access for the user to connect an audio cable 32. A light emitting diode 108 is provided at a visible position to confirm reliable connection to the vehicle power system. In an alternative embodiment (FIG. 7c), the vehicle interface unit 6 is omitted, and a simple pigtail lead 112 is provided for direct interface to the vehicle electrical systems.

The interface enclosure 16 in FIG. 7 illustrates some of the components disposed therein. These include the first antenna jack 82 and second antenna jack 88. The first jack 82 is coupled to the radio interface cable 18, and the second jack 88 is coupled to the satellite antenna cable 50. An audio output jack 90 is provided for direct connection of an audio device through audio cable 52 to the interface enclosure 16. A vehicle antenna input jack 94 is provided for connection of the existing vehicle FM antenna cable 56. A vehicle antenna output jack 92 is provided for connection of an FM antenna cable 54 to the existing vehicle FM radio system. Within the interface enclosure 16 is an FM coupling circuit 100, battery charging circuit 98, and a bank of rechargeable batteries 96.

Figure 8:
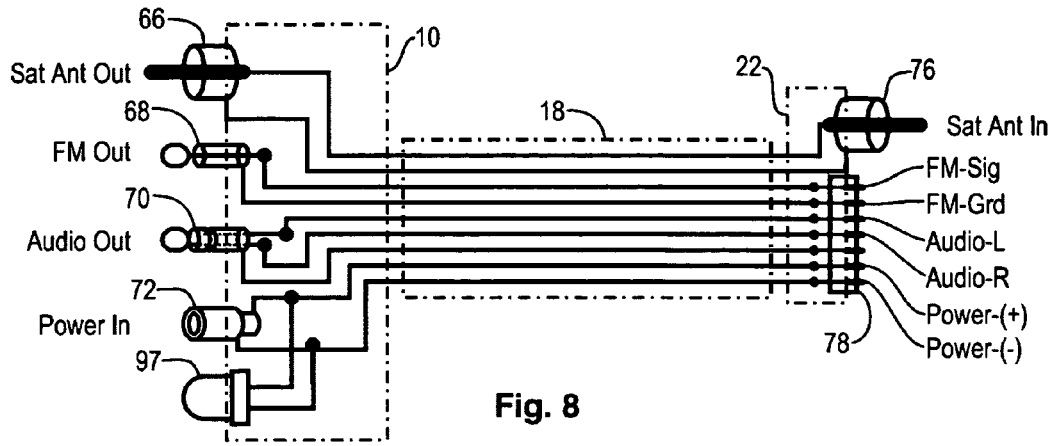
FIG. 8 is a schematic diagram of a conformal connector and radio interface cable according to an illustrative embodiment of the present invention.

Reference is directed to FIG. 8, which is a schematic diagram of the conformal connector 10 and radio interface cable 18 according to an illustrative embodiment of the present invention. The radio interface cable detachable connector 20 is also included in FIG. 8. The conformal connector 10 includes the satellite antenna plug 66, the FM output plug 68, the audio output plug 70, and the power input plug 72. The LED 97 is coupled in parallel to the power plug 72. The single sheath cable 18 is coupled to the detachable connector 22, which supports the satellite antenna connector 76 and the bus connector 78. The bus connector wiring is illustrated and includes the FM signal, FM ground, left audio signal, right audio signal, audio ground, positive power and negative power conductors.

Figure 9:
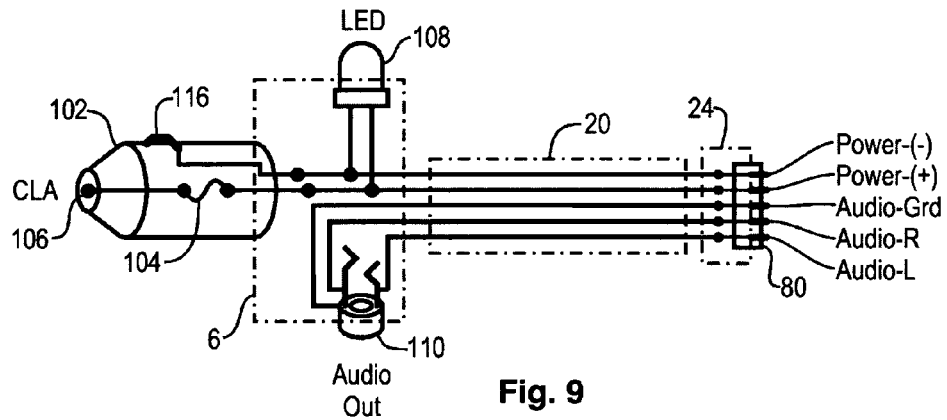
FIG. 9 is a schematic diagram of a vehicle interface cable according to an illustrative embodiment of the present invention.

Reference is directed to FIG. 9, which is a schematic diagram of a vehicle interface cable 20 according to an illustrative embodiment of the present invention. The illustrative embodiment includes the vehicle interface unit 6. The CLA plug 102 is wired with a positive contact terminal 106 routed through an internal fuse 104, and includes a negative terminal contact 116. The power LED 108 is wired in parallel with the power contacts 106, 116, and thereby indicates when power is available from the vehicle. The audio output jack 110 is also included. All of these components are electrically coupled to the detachable connector 24 for coupling to the interface enclosure. The detachable connector includes conductors for the left audio signal, right audio signal, audio ground, positive power and negative power conductors.

Figure 10:
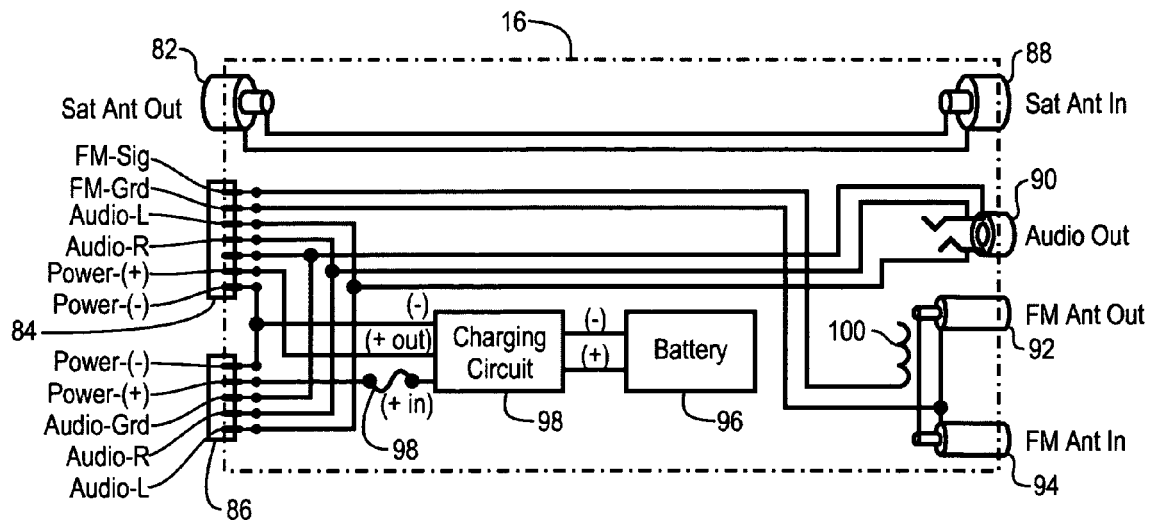
FIG. 10 is a schematic diagram of an interface enclosure according to an illustrative embodiment of the present invention.

Reference is directed to FIG. 10, which is a schematic diagram of the interface enclosure 16 according to the illustrative embodiment of the present invention. The interface enclosure includes the radio interface cable detachable jack 84 and the vehicle interface cable detachable jack, with the signal conductors that are itemized in the description of the corresponding cable connectors, and will not be reiterated here. Note that the audio signals are wired in parallel to the audio output jack 90. The satellite antenna input jack 88 is directly coupled to the satellite antenna output jack 82, using an RF coaxial cable. The FM modulator signal is coupled from connector 84 to the radio frequency coupler 100 and to the FM antenna input 94 and output 92 jacks. Any suitable RF coupler known to those skilled in the art can be employed. A rechargeable battery bank 96 is coupled through a charging circuit 98 to the radio interface cable connector 84 and the vehicle interface connector 86. This enables the charging of the batteries 96 thought the vehicle interface connector 86, via fuse 98, and enables the provision of power to the radio interface connector 84 either directly from the vehicle power or from the battery 96. The charging circuit can be any of the types known to those skilled in the art. The capacity of the storage batteries 96 is selected according to the radio power requirements and the desired battery operation time period, as will be appreciated by those skilled in the art.

Figure 11:
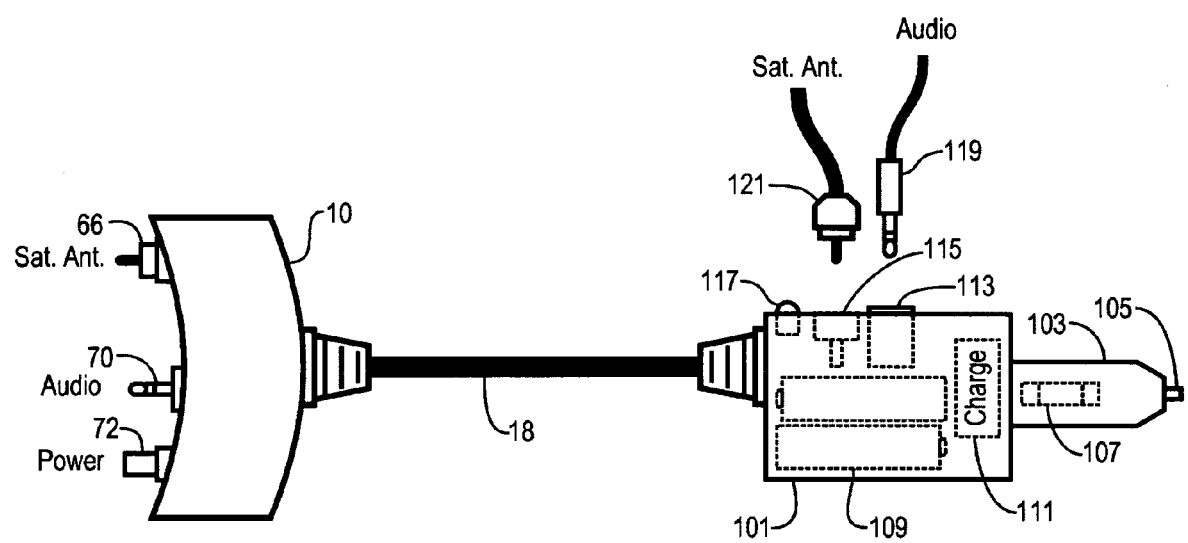
FIG. 11 is a functional block diagram of a portable radio interface system according to an illustrative embodiment of the present invention.

Reference is directed to FIG. 11, which is a functional block diagram of a portable radio interface apparatus according to an alternative illustrative embodiment of the present invention. The apparatus on FIG. 11 is a reduced cost and complexity unit for use with the satellite radio discussed hereinbefore. A conformal connector 10 includes the satellite antenna connector 66, the audio output connector 70, and the power connector 72. The radio interface cable 18 couples the conformal connector to the interface enclosure 101, which includes the vehicle interface. The vehicle interface is a CLA plug 103 with power connector 105 and fuse 107 therein. Within the interface enclosure 101 is the storage battery 109, the charging circuit 111, the audio output jack 113, the satellite antenna cable input jack 115, and the power LED 117. The satellite antenna cable 121 and audio output cable 119 connect directly to the interface enclosure 101, which is supported by the CLA plug in the host vehicle. The embodiment in FIG. 11 represents a simplified version that can be more quickly installed, and is suitable for installation by a somewhat less skilled individual than other embodiments.

Figure 12:
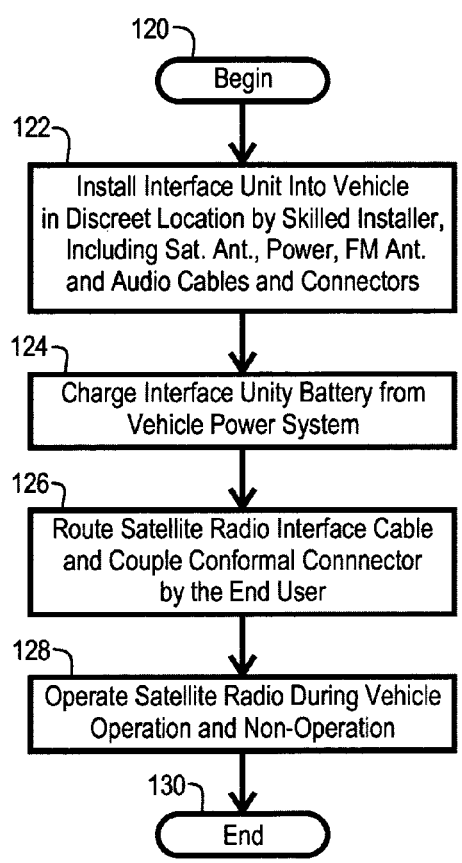
FIG. 12 is a process flow diagram of a vehicular interface installation according to an illustrative embodiment of the present invention.

Reference is directed to FIG. 12, which is a process flow diagram of a vehicular interface installation according to an illustrative embodiment of the present invention. The process begins at step 120 and proceeds to step 122 where a skilled installer installs the interface enclosure in the host vehicle together with the attendant power wiring, satellite antenna and cable, FM radio antenna wiring and audio wiring. At step 124, the battery in the interface enclosure is charged whenever the host vehicle provides power to the CLA plug or fuse box. At step 126, the user couples the radio interface cable, and couples the conformal connector to the portable radio. At step 128, the radio is operated either during vehicle operation or non-operation periods. The process ends at step 130.

Figure 13:
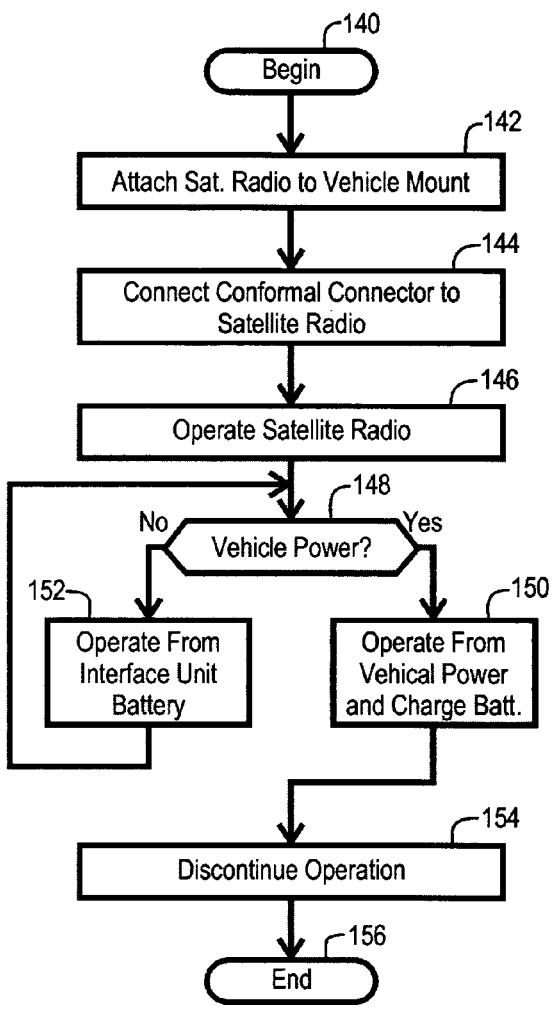
FIG. 13 is a process flow diagram of the radio operation according to an illustrative embodiment of the present invention.

Reference is directed to FIG. 13, which is a process flow diagram of the radio operation according to an illustrative embodiment of the present invention. The process begins at step 140 and proceeds to step 1422 where the user attaches the satellite radio to the structural mount in the vehicle. At step 144, the user connects the conformal connector to the satellite radio. At step 146, normal operation of the radio commences. At step 148, there is a determination as to whether power is available from the host vehicle or not. If power is not available, then the batteries in the interface enclosure deliver power to the radio, and flow recycles to step 148 until vehicle power is again available. When vehicle power is available, then flow proceeds to step 150, where the host vehicle electrical system provides power to operate the radio and recharge the batteries in the interface enclosure. At step 154, the user discontinues radio operation and the process ends at step 156.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A portable radio vehicular interface apparatus, for interfacing with a portable radio in a vehicle with a power system, the portable radio having an external antenna terminal for coupling radio signals with an external antenna cable, and having an external power terminal, the apparatus comprising:
 a conformal connector having a first antenna connector and a first power connector configured to conform to the shape of the portable radio housing and electrically engage the external antenna terminal and external power terminal;
 an interface enclosure having a second antenna connector, disposed on the exterior thereof, for engaging the external antenna cable, and having a battery disposed in the interior thereof and a charging circuit with a power input terminal and a power output terminal, and operable charge said battery and to deliver power to said power output terminal from either of said power input terminal or said battery;
 a radio interface cable covered by a single sheath with a first end coupled to said conformal connector and a second end coupled to said interface enclosure and encasing an antenna conductor connected between said first antenna connector and said second antenna connector, and a first power conductor coupled between said first power connector and said power output terminal, and
 a vehicle interface having a second power conductor coupled to said power input terminal and adapted to connect to the vehicle power system.

2. The apparatus of claim 1 wherein said vehicle interface is a cable coupled to said interface enclosure.

3. The apparatus of claim 1 wherein said vehicle interface includes a cigarette lighter adapter for engaging a cigarette lighter socket in the vehicle.

4. The apparatus of claim 1 wherein the portable radio has an audio output terminal, and wherein:
 said conformal connector further includes a first audio connector for engaging the audio output terminal;
 said interface enclosure further includes a second audio connector, and
 said radio interface cable further includes an audio conductor coupled between said first audio connector and said second audio connector.

5. The apparatus of claim 1 wherein the portable radio has an FM modulator output terminal, and wherein:
 said conformal connector further includes an FM modulator connector for engaging the FM modulator terminal;
 said interface enclosure further includes an FM antenna input connector coupled to an FM output connector, and further includes an FM signal coupler disposed to couple FM signals to said FM antenna output connector, and wherein
 said radio interface cable further includes an FM signal conductor coupled between said FM modulator connector and said FM signal coupler.

6. The apparatus of claim 1 wherein said interface enclosure further includes a circuit protector electrically coupled to said power input terminal.

7. The apparatus of claim 1 wherein said interface enclosure is formed with a flat profile, thereby enabling installation in narrow locations within the vehicle interior.

8. The apparatus of claim 1 wherein said conformal connector is designed to compliment the industrial design of the portable radio.

9. The apparatus of claim 1 wherein said interface enclosure further includes a visual power indicator coupled to said power input terminal, thereby indicating the availability of power from the vehicular power system.

10. The apparatus of claim 1 wherein said conformal connector further includes a visual power indicator coupled to said first power conductor, thereby indicating the availability of power from the vehicular power system.

11. The apparatus of claim 1 wherein said vehicle interface includes a cigarette lighter adapter plug for engaging a cigarette lighter socket in the vehicle.

12. The apparatus of claim, 11 wherein said interface enclosure and said cigarette lighter adapter plug are coupled together with a vehicle interface cable encasing said second power conductor.

13. The apparatus of claim 11 wherein said interface enclosure and said vehicle interface cable are coupled through a detachable electrical connector.

14. The apparatus of claim 1 wherein said radio interface cable and said interface enclosure are coupled through a detachable electrical connector.

* * * * *